(12) United States Patent
West et al.

(10) Patent No.: US 6,673,494 B2
(45) Date of Patent: Jan. 6, 2004

(54) EXPANDED ZINC MESH ANODE

(75) Inventors: Jack T. West, McFarland, WI (US); Jim Dyer, Greeneville, TN (US); Albert H. Giles, Greeneville, TN (US); Jon Headrick, Greeneville, TN (US); Johnny Smelcer, Midway, TN (US); Randy Beets, Bulls Gap, TN (US)

(73) Assignee: Alltrista Zinc Products, L.P., Greeneville, TN (US)

(*) Notice: Subject to any disclaimer, the term of this patent is extended or adjusted under 35 U.S.C. 154(b) by 33 days.

(21) Appl. No.: 10/076,998

(22) Filed: Feb. 15, 2002

(65) Prior Publication Data
US 2003/0157406 A1 Aug. 21, 2003

(51) Int. Cl.[7] .............................. H01M 4/72
(52) U.S. Cl. ................... 429/233; 429/229; 429/243
(58) Field of Search ................. 429/233, 238, 429/241, 242, 243, 229

(56) References Cited

U.S. PATENT DOCUMENTS

| | | |
|---|---|---|
| 3,205,097 A | 9/1965 | Clune et al. |
| 3,653,965 A | 4/1972 | Lee |
| 3,930,882 A | 1/1976 | Ohsawa et al. |
| 3,944,430 A | 3/1976 | Lee |
| 3,945,847 A | 3/1976 | Kordesch et al. |
| 3,956,018 A | 5/1976 | Kozawa |
| 3,970,477 A | 7/1976 | Ciliberti |
| 4,084,047 A | 4/1978 | Himy et al. |
| 4,175,168 A | 11/1979 | Armstrong et al. |
| 4,226,920 A | 10/1980 | Armstrong |
| 4,237,205 A * | 12/1980 | Matter .................... 429/234 |
| 4,327,157 A | 4/1982 | Himy et al. |
| 4,695,522 A | 9/1987 | Nalewajek et al. |
| 5,122,375 A | 6/1992 | Sklarchuck et al. |
| 5,780,186 A | 7/1998 | Casey, Jr. |
| 5,856,040 A | 1/1999 | Newman et al. |
| 5,958,625 A * | 9/1999 | Rao ....................... 429/241 |
| 6,060,196 A | 5/2000 | Gordon et al. |
| 6,060,197 A | 5/2000 | McEvoy et al. |
| 6,106,978 A * | 8/2000 | Takeuchi ................ 429/235 |
| 6,203,940 B1 | 3/2001 | Oltman et al. |
| 6,210,826 B1 | 4/2001 | Dopp et al. |
| 6,210,827 B1 | 4/2001 | Dopp et al. |
| 6,221,527 B1 | 4/2001 | Tang |

* cited by examiner

Primary Examiner—Randy Gulakowski
Assistant Examiner—Monique Wills
(74) Attorney, Agent, or Firm—Ice Miller; Doreen J. Gridley; James D. Wood (57) ABSTRACT

An anode comprises one or more sheets of expanded zinc mesh. The thickness and mesh size of the expanded zinc mesh may vary. A single sheet of zinc mesh may be coiled, forming continuous electrical contact with itself. Alternatively, a single sheet of zinc mesh may be folded into layers, each layer in electrical contact with its adjacent layers. A third alternative is the use of two or more sheets of zinc mesh, layered on top of each other so that each layer is in electrical contact with adjacent layers. These zinc mesh anodes are combined with a casing, a cathode, an electrolyte solution, and a separator between the cathode and anode to manufacture electrochemical cells.

20 Claims, 8 Drawing Sheets

EXPANDED ZINC MESH ANODE

FIELD OF THE INVENTION

This invention relates to the field of electrochemical power cells, and in particular to zinc anodes in such cells.

BACKGROUND OF INVENTION

In today's world of portable electronics and electric power tools, batteries are more important to our daily lives than ever before. Along with the growth of the portable consumer electronics market, the demand for inexpensive, long-lasting, powerful batteries has increased dramatically. Battery manufacturers continue to look for new ways to pull more power, for a longer duration, and more efficiently from their products. In addition to the drive for more powerful and longer lasting batteries, manufacturers are aware of the need to be environmentally conscious and the need to eliminate or minimize the use of harmful additives, such as mercury (Hg), from their products.

Many of the batteries marketed today are alkaline cells. A typical alkaline cell includes a cathode, an anode, an alkaline electrolyte, and a container. Generally speaking, the cathode is usually composed of manganese dioxide ($MnO_2$), and the anode is typically made of zinc or a mixture of zinc and other compounds. The electrolyte usually consists of mainly potassium hydroxide (KOH), but often contains other additives. These components are usually encapsulated in a container. There are currently several shapes of containers, but two of the most common are cylinder shapes in varying sizes such as in the well known "AA", "C", and "D" cells, and smaller flat button cell batteries that are used in such devices as cameras and hearing aids.

Like all batteries in general, alkaline cells produce power through chemical reactions known as oxidation-reduction (redox) reactions. In zinc alkaline batteries this reaction consumes the zinc anode material and converts it to zinc oxide/hydroxide. As the redox reaction proceeds the zinc oxide/hydroxide deposits and accumulates within the electrolyte domain between and around the zinc anode particles. As it accumulates, it blocks the reaction site pathways by forming a barrier between the electrolyte solution and the zinc anode. The accumulation of these deposits decreases the power capacity of the battery significantly, particularly on high rate drains.

A decrease of reactivity, known as passivation, of the zinc is caused by this build-up of zinc oxide on the surface of the zinc anode. The problem is increased when the surface area of the zinc anode is low. With a small surface area and high discharge rates, surface current densities are high. This causes the anode to become highly polarized and leads to passivation of the zinc until the current density is reduced. The problems of polarization and passivation are especially of concern at low temperatures because at lower temperatures the solubility of zinc oxide in the electrolyte decreases. Lower solubility of the zinc oxide leads to a faster accumulation of zinc oxide, quickly blocking reaction site pathways. However, this problem can be reduced by presenting a higher surface area of zinc. An increase in the surface area of zinc lowers the surface current density and helps to delay the onset of passivation. Thus, with all other factors being equal the higher the surface area of the zinc anode the better the overall performance of the alkaline cell.

The problem of passivation is of particular concern under high rate drain conditions. For example, in a cell utilizing an electrolyte of potassium hydroxide, high rate drains drive electrolyte concentrations to extremes creating low potassium hydroxide concentrations in the anode cavity and very high concentrations around and within the pores of the cathode. While zinc oxide solubility dramatically increases within the pores of the cathode and within the cathode/separator/anode cavity interface, zinc oxide solubility falls off dramatically in dominantly electrochemically active areas of the anode cavity. As the interdiffusion of electrolyte species occurs in the attempt to sustain equilibrium, electrolyte of high potassium hydroxide strength and high zinc oxide solubility diffuses toward electrolyte domains low in potassium hydroxide and zinc oxide content. The result is a localized precipitation of zinc oxide close to the separator but within the anode cavity. A zinc oxide compaction zone results which eventually inhibits electrolyte diffusion at the rate necessary to support the high rate drain.

The current art typically uses zinc powder in order to achieve a maximum surface area and to delay the onset of passivation. This zinc powder provides a very large surface area. However, the use of zinc powder has a number of drawbacks. First, if zinc powder is used alone there is a tendency for it to be mobile and sensitive to shock allowing particle to particle contact to be intermittently disrupted. Anodes of powdered zinc require intimate particle to particle contact as well as intimate current collector contact. To prevent unwanted movement of particles, a suspension agent or gelling agent is usually added to the electrolyte solution of the battery. The suspension agent inhibits the zinc powder mobility and helps maintain particle contact throughout the cell container. It would be more efficient if a suspension agent were not needed since it also interferes with ion transport. By decreasing the amount of suspension agent or gelling agent required, the battery design is simplified and costs are reduced. Another drawback to using zinc powder is its relative cost. The world is undergoing a battery-grade zinc powder shortage that drives the relative cost of zinc powder up. Thus, zinc powder is more expensive when compared with non-powdered zinc such as zinc mesh, zinc strip, or other solid zinc products.

Still another problem with the use of zinc powder as the anode in alkaline cells is the increased cost and loss of performance due to waste. When an alkaline battery having a zinc powder anode is completely discharged at high discharge rates and is "autopsied", it is observed that only approximately 50% of the zinc powder has been consumed. The reaction of the balance of the zinc powder has been inhibited by disruption of interparticle electrical contact by the deposits of zinc oxide/hydroxide. This leaves a significant amount of zinc powder in the battery which was not utilized to produce power. This decreases the amount of time before the onset of cell failure due to a decrease in the available surface. This wasted zinc drives up the costs of alkaline batteries in two ways. First, larger amounts of zinc powder are required to achieve the same amount of battery output. Second, the volume wasted by this excess zinc could be used for extra electrolyte. Increasing the amount of electrolyte would allow the manufacturers to increase the battery's capacity.

Zinc powder negative electrodes are much less efficient at high discharge rates than at low discharge rates. Currently, to improve efficiency some zinc anodes are amalgamated with mercury. Mercury dramatically improves interparticle contact inhibiting the onset of low interparticle contact. Since mercury is environmentally dangerous, use of mercury is highly undesirable. However, due to its ability to improve interparticle contact, the removal of mercury from cell designs without causing cell quality problems has been difficult. Thus, an alternative to zinc powder which is more efficient at high discharge rates without the use of mercury is needed. This alternative needs to retain the high surface area of powdered zinc but avoid the problems associated with powdered zinc.

One alternative that has been explored by the industry to the use of zinc powder while still yielding more surface area than solid zinc is the use of perforated zinc as an anode. This material is readily available in spite of the world shortage of battery-grade zinc powder. However, the use of perforated zinc has its own problems. First, perforated zinc is manufactured by punching holes in solid sheets of zinc. This creates two problems. First, the material punched from the zinc is wasted. Second, there is manufacturing difficulty in making precise perforations. While these problems are significant, the largest problem that makes the use of perforated zinc undesirable is that the perforation does not substantially increase the surface area of the electrode. While some new surface area is generated, there is also a loss of surface area associated with the material punched out of the zinc. Thus, when compared to powdered zinc, perforated zinc has a relatively low surface area.

Another alternative to zinc powder is the use of expanded zinc mesh. The use of expanded zinc mesh is desirable because it provides a large surface area and is currently more available and cheaper than zinc powder. However, previously disclosed methods of using zinc mesh have had their own problems. For example, a method of using expanded zinc mesh as an anode was disclosed in U.S. Pat. No. 4,175,168. The expanded zinc mesh was folded to create an anode. Zinc spacers were used to separate the folded layers of the zinc mesh anode in the cell. U.S. Pat. No. 4,226,920 discloses another expanded zinc mesh anode. This anode was formed by winding the zinc mesh to create a coil. Spacers were again used to provide a substantially uniform space between adjacent layers of the coil. The space between the electrode layers in these two anode designs was necessary to allow adequate electrolyte flow between the layers and to maintain adequate battery performance. However, this use of spacers to separate the layers of the anode is undesirable because it requires the use of additional materials and adds additional manufacturing costs. A zinc anode design that does not require the use of spacers to maintain battery performance is needed.

Alkaline batteries are used in hearing aids, flashlights, power hand tools, and electronic toys and games. Many new electronics require batteries that are efficient at high discharge rates. Therefore, there is a need for a battery that delivers more power capacity, is more efficient at high discharge rates, avoids the manufacturing expense of using suspension gels or spacers, minimizes the use of environmentally damaging compounds such as mercury, and uses a more available and inexpensive material than battery-grade zinc powder. In short, it is desirable to develop an alkaline battery anode comprised of expanded zinc mesh which reduces or eliminates the shortcomings of prior art anodes.

BRIEF SUMMARY OF THE INVENTION

The present invention presents a solution to the above problems by providing zinc anodes having improved performance without the use of zinc powder. More specifically, the present invention provides for the use of expanded zinc mesh to increase battery performance at high discharge rates and to improve the efficiency of the anode design to decrease the amount of unreacted zinc in the oxidation-reduction reaction. The present invention also provides for electrochemical cells incorporating the improved zinc anode designs.

The present invention improves battery performance through the use of expanded zinc mesh to construct an anode of increased surface area with one of three basic designs. A "coiled" zinc anode of the present invention comprises a single sheet of zinc mesh wrapped into a coil. A "layered" zinc anode of the present invention comprises two or more sheets of zinc mesh layered together so that each layer is in electrical contact with adjacent layers. A "folded" zinc anode of the present invention comprises a single sheet of zinc mesh folded upon itself to form two or more layers that are in electrical contact with their adjacent layers.

In all three instances, the use of spacers between the layers of the mesh as taught by the prior art is avoided to lower material and manufacturing costs. Instead of maintaining a uniform space between the layers of the zinc mesh, the present invention utilizes anode configurations in which the layers of expanded zinc mesh are in direct physical contact. The direct contact of these layers creates electrical contact points between the zinc mesh layers of the anode. These electrical contacts work with the mesh to form a continuous lattice network that allows for better connectivity of the zinc to increase performance at high discharge rates.

The present invention also encompasses electrochemical cells employing each of the three disclosed types of zinc mesh anodes. These electrochemical cells are generally comprised of a casing, one of the described anodes, a cathode, an insulating separator between the anode and cathode, and electrolyte solution. These and other features, aspects, and advantages of the present invention will become better understood with reference to the following description and claims.

DESCRIPTION

Figure 1:
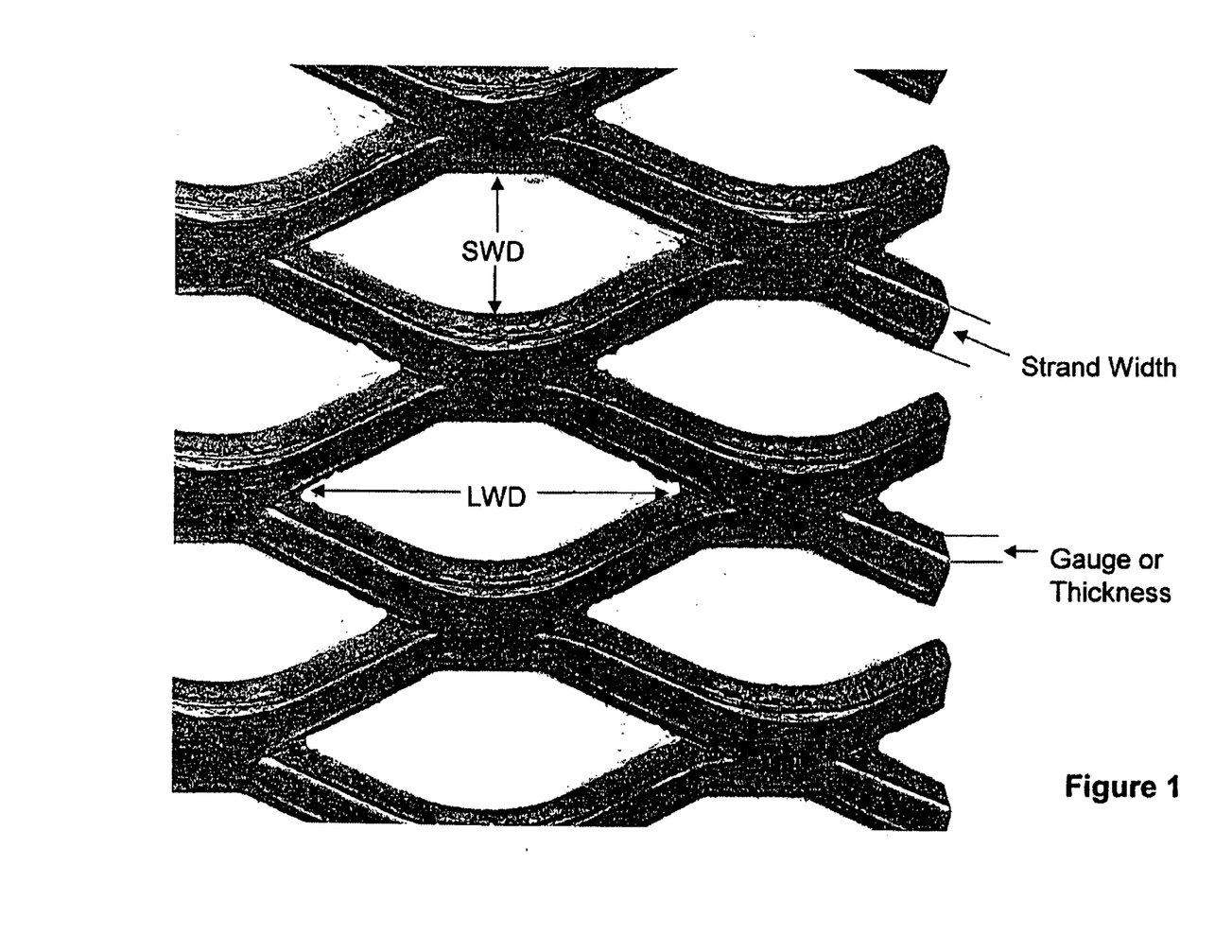
FIG. 1 shows an enlarged pictorial view of a sheet of expanded zinc mesh according to one embodiment of the present invention.

The present invention provides for the use of expanded zinc mesh as an anode in batteries of various configurations. As depicted in FIG. 1, zinc mesh can be characterized by a number of physical dimension measurements. First, zinc mesh can be described by the width of the strands of zinc making up the mesh. Second, zinc mesh can be described by the gauge of the strands of mesh. In a sheet of zinc mesh, these strands of zinc cross at a number of vertices. The crossing strands of zinc define a number of parallelogram shaped openings in the sheet of zinc mesh. The size of these openings can also be used to characterize sheets of expanded zinc mesh. These openings can be described by the distances from the center of one vertex to the center of an adjacent vertex. As shown in FIG. 1, these distances can be represented by LWD and SWD, for long way of design and short way of design, respectively.

Figure 2:
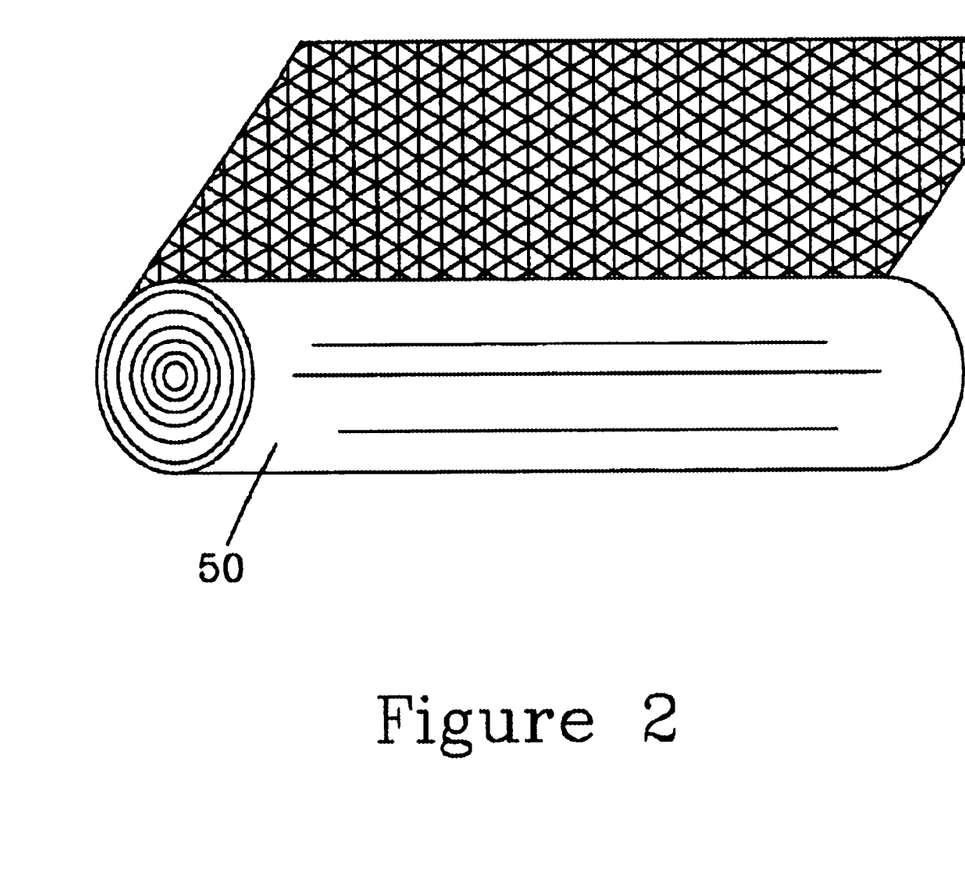
FIG. 2 shows a perspective view of a partially coiled zinc mesh anode of the type used in some embodiments of the present invention.

FIG. 2 shows one embodiment of an anode of the present invention. As illustrated in FIG. 2, a zinc mesh is coiled such that each layer of the coil is in electrical contact with an adjacent layer in order to form anode 50. Coiling the electrode in this manner creates a continuous cylindrical lattice. This continuous lattice is sustained whether a tightly coiled anode or a loosely coiled anode is produced. This configuration allows better connectivity of the zinc and allows for the use of an increased electrolyte to zinc ratio that powdered zinc cells cannot utilize without the loss of interparticle contact. This increases battery performance at high discharge rates by delaying the onset of zinc oxide compaction. Additionally, this design alleviates the need for spacers to maintain uniform space between the layers of the electrode. The elimination of spacers eliminates material and manufacturing costs.

Figure 3:
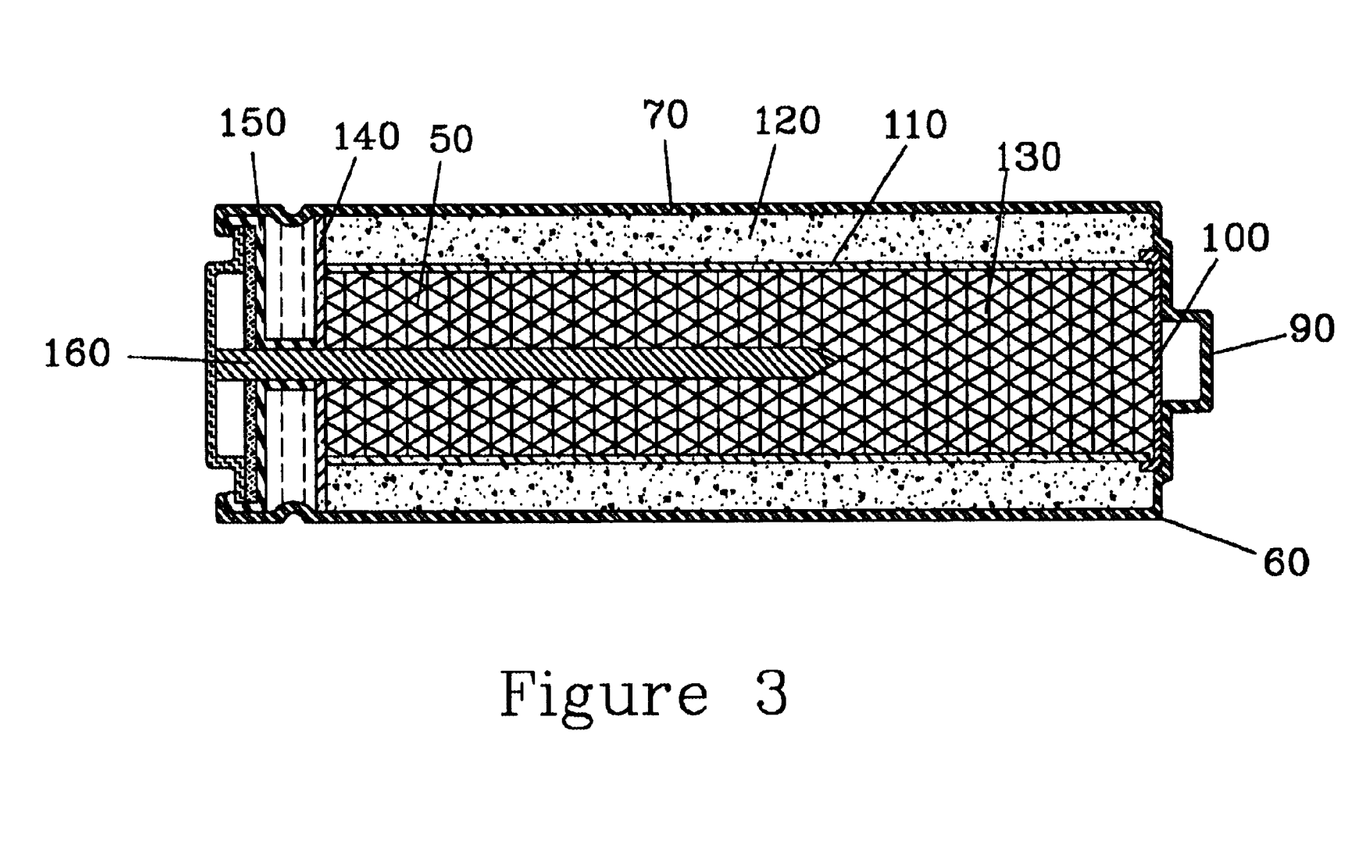
FIG. 3 shows a cross-sectional view of one embodiment of a "AA" battery employing a coiled zinc mesh anode according to the present invention.

FIG. 3 is a cross-sectional view of a cylindrical battery 60 utilizing anode 50. The exterior of battery 60 is defined by a cylindrical shaped steel casing 70 which is the industry standard size and shape of a "AA" battery. At one end of casing 70 is a raised circular post 90 that contacts the terminals of whatever device battery 60 is installed in. The opposite end of casing 70 is initially open during the manufacturing process. Paper cap 100 is installed in the interior of casing 70 at the end containing circular post 90. Anode 50 is installed in the center of casing 70 and extends most of the length of casing 70 as depicted in FIG. 3. Paper cap 100 is adjacent to one end of anode 50 and insulates anode 50 from casing 70. Separator paper 110 extends around the longitudinal axis of anode 50. Cathode 120 (in this case a powdered material) is located between casing 70 and separator paper 110.

Electrolyte solution 130 fills the excess volume of casing 70. Typically, electrolyte solution 130 is a potassium hydroxide solution. However, those skilled in the art will appreciate that there are many different alkaline electrolyte solutions that could possibly be employed, such as sodium hydroxide. The use of zinc mesh allows electrolyte solution 130 to flow freely throughout anode 50 and presents a large surface area of direct zinc to electrolyte contact. This large surface area, in connection with the lattice network of the mesh helps eliminate the problem of impaired conduction pathways that is created when zinc powder is used. In conventional batteries, as zinc powder is consumed, the distance between the unreacted powder particles and the electrolyte increases impairing the conduction path. By sharply reducing this problem the percent of wasted, unreacted zinc is decreased. This allows the use of less zinc to produce the same amount of energy. Using less zinc in the anode allows more room for the use of more electrolyte solution 130 in casing 70.

Once anode 50, cathode 120, separator paper 110, and electrolyte solution 130 are positioned in casing 70, paper cap 140 and plastic insulator 150 are installed in the open end of casing 70. Paper cap 140 and plastic insulator 150 each have a small hole in their center to allow the insertion of current collector 160 into battery 60. One end of current collector 160 is a rod which slides through the holes in paper cap 140 and plastic insulator 150 and extends down through the longitudinal axis of anode 50. The other end of current collector 160 is circular and seals the open end of casing 70. Paper cap 140 and plastic insulator 150 prevent current collector 160 from contacting cathode 120 and in conjunction with current collector 160 form a tight seal to prevent the escape of electrolyte solution 130 from battery 60.

It will be appreciated by those of skill in the art that other means for separation other than paper separator 110 may be used to divide the battery into an anode side and cathode side, such as a separator film. Any such insulating separator used must prevent the direct flow of electricity between the anode and cathode. Any direct flow of electricity between the anode and the cathode would cause the cell to internally short circuit. Additionally, any insulating separator must also allow electrolyte solution 130 to diffuse through. Any suitable material exhibiting these insulating and diffusion qualities could be used as a separator.

Figure 4:
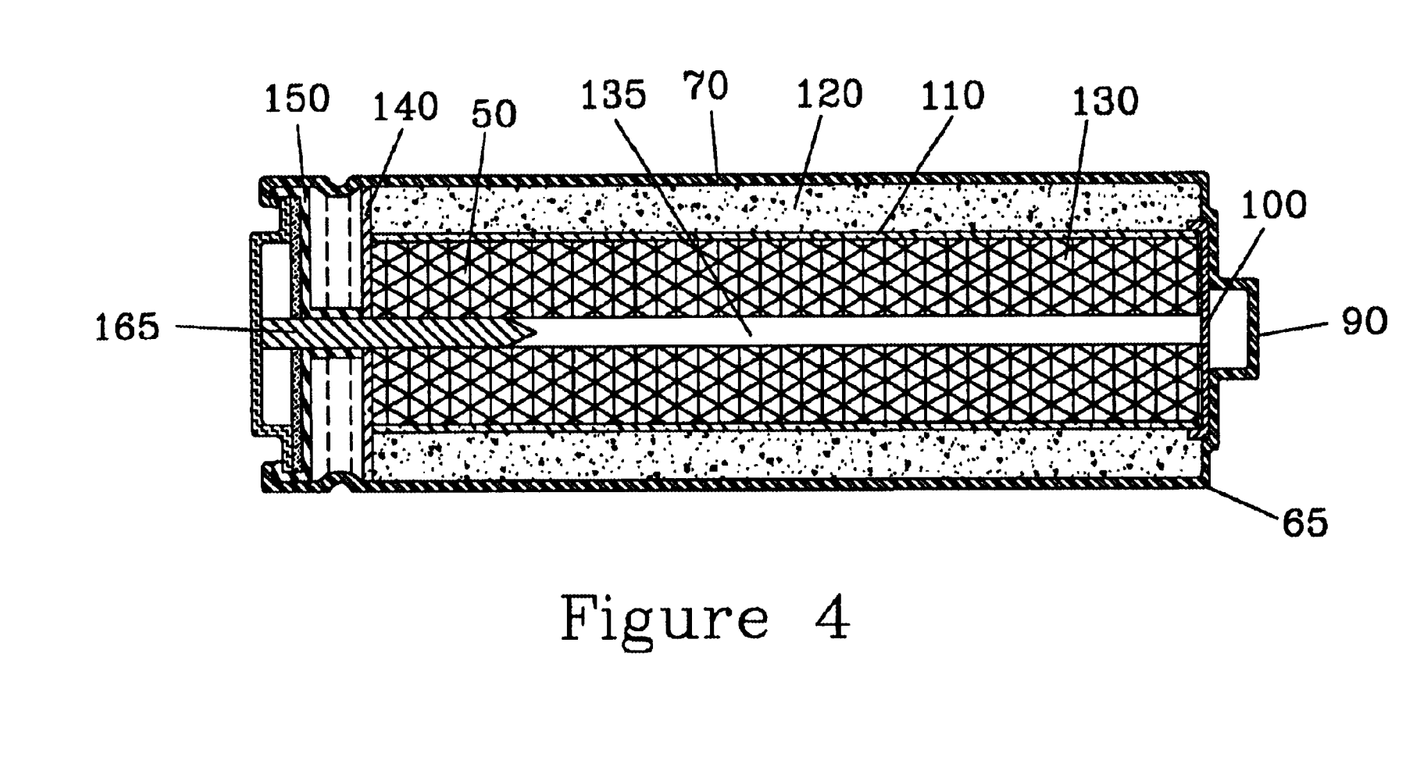
FIG. 4 shows a cross-sectional view of another embodiment of a "AA" battery employing a coiled zinc mesh anode according to the present invention.

FIG. 4 illustrates cylindrical battery 65 which is a modification of battery 60 that utilizes a shortened current collector 165. Like current collector 160, one end of current collector 165 is circular and seals the open end of casing 70. The other end of current collector 165 is a rod which slides through the holes in paper cap 140 and plastic insulator 150 and extends down through the longitudinal axis of anode 50. However, the rod of current collector 165 is shorter than that of current collector 160 in the previous embodiment. Electrolyte solution 130 fills the excess volume to form an electrolyte reservoir 135 defined by the innermost layer of the coiled mesh of anode 50.

By shortening current collector 165, the embodiment of FIG. 4 is able to improve on the efficiency and performance characteristics over the embodiment of FIG. 3. The reasons for this increase in efficiency are twofold. First, the creation of electrolyte reservoir 135 in this excess volume allows for a larger volume of electrolyte solution to be utilized in battery 65 without increasing the volume of battery 65 itself. As discussed below, increasing the amount of electrolyte helps to increase cell capacity. Second, electrolyte reservoir 135 allows for better electrolyte transfer thereby increasing cell performance.

Figure 5:
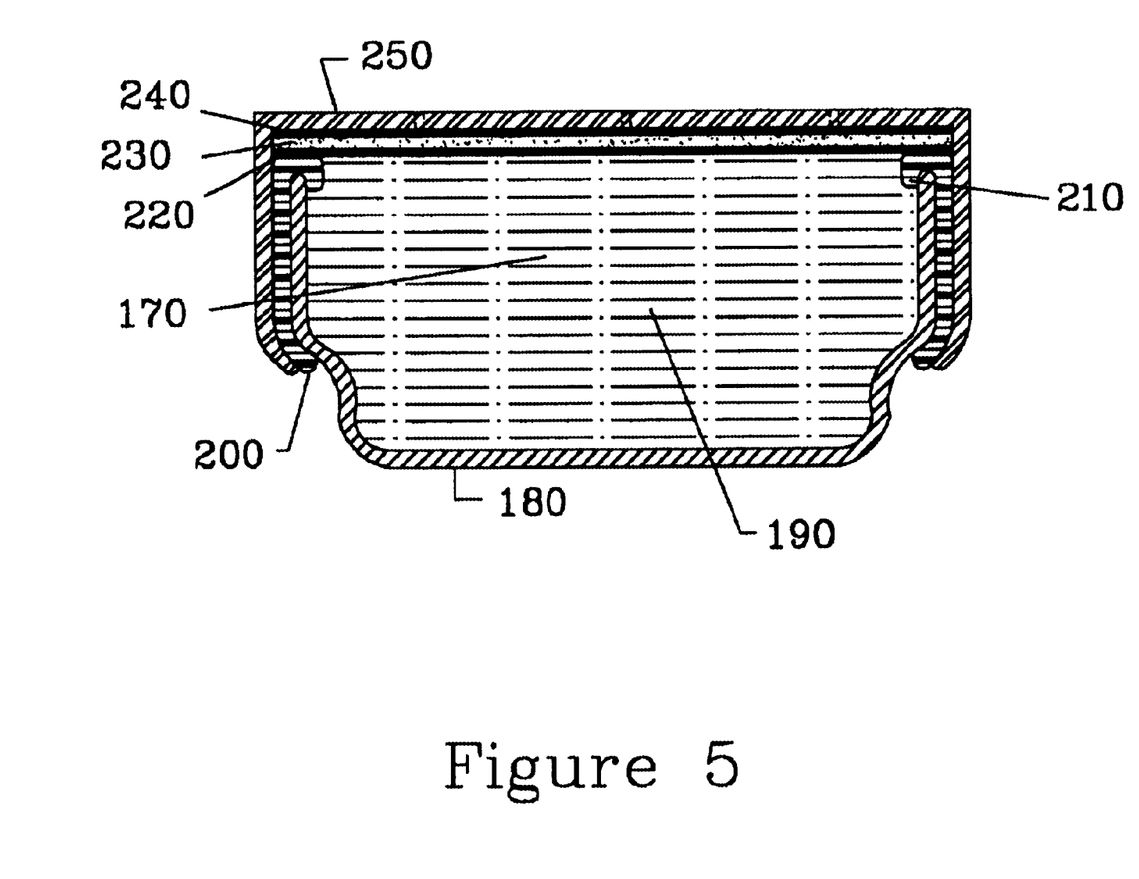
FIG. 5 shows a cross-sectional view of one embodiment of a "button" cell battery employing a layered zinc mesh anode according to the present invention.

FIG. 5 illustrates another embodiment of the present invention. As can be seen in FIG. 5, this embodiment is a flat "button" cell type battery configured to be compatible with many current electronic devices. This cell utilizes the layered zinc mesh anode 170 pictured in FIG. 7. Anode 170 is created by layering sheets of expanded zinc mesh such that each sheet is in electrical contact with the adjacent sheets. In this configuration, a sheet of zinc mesh is placed directly on top of and in electrical contact with another sheet of zinc mesh. A third sheet is then placed on top of the stack and in electrical contact with the underlying sheet. This layering process is then continued with each subsequent sheet being in electrical contact with the previous sheet. Layering the zinc mesh in this manner creates a continuous lattice of zinc. The creation of a continuous lattice allows for better connectivity of the zinc, increasing battery performance at high discharge rates. As with the cylindrical cell discussed above, the layers of mesh are in direct contact alleviating any need for spacers to maintain uniform space between the layers of the electrode.

Returning to FIG. 5, anode 170 is contained in cup-shaped steel cap 180 which is open at one end. The outer walls of steel cap 180 define a chamber into which anode 170 is placed. In addition to holding anode 170, the exterior of steel cap 180 acts as the negative electrode of the button cell once the cell is complete. Once anode 170 is in position in steel cap 180, the remaining volume of steel cap 180 is filled with electrolyte solution 190. Electrolyte solution 190 is allowed to flow freely through and around anode 170.

Ring-shaped plastic insulator 200 is molded with u-shaped lip 210. U-shaped lip 210 fits around the circumference of the open end of steel cap 180. Plastic insulator 200 is molded to fit snugly around the exterior of steel cap 180 and is held snugly in place by u-shaped lip 210. Once plastic insulator 200 is in place, laminated separator film 220 is placed across the opening in steel cap 180. The outside circumference of separator film 220 rests on u-shaped lip 210 of plastic insulator 200. A layer of cathode material 230 is then sandwiched between separator film 220 and another laminated cover 240. As depicted in FIG. 4, separator film 220 physically separates anode 170 from cathode material 230, but allows the passage of electrolyte solution between the two.

Laminated cover 240, cathode material 230, and separator film 220 are held in position by another roughly cup-shape steel cup 250. Steel cup 250 has a diameter larger than steel cap 180. The interior diameter of steel cup 250 is about equivalent to the outer diameter of plastic insulator 200. Additionally, steel cup 250 is shaped such that it fits snugly around plastic insulator 200. The flat bottom side of steel cup 250 is formed with a number of holes (not pictured in the figure). When the cell is complete, steel cup 250 acts as the positive electrode of the button cell.

Figure 6:
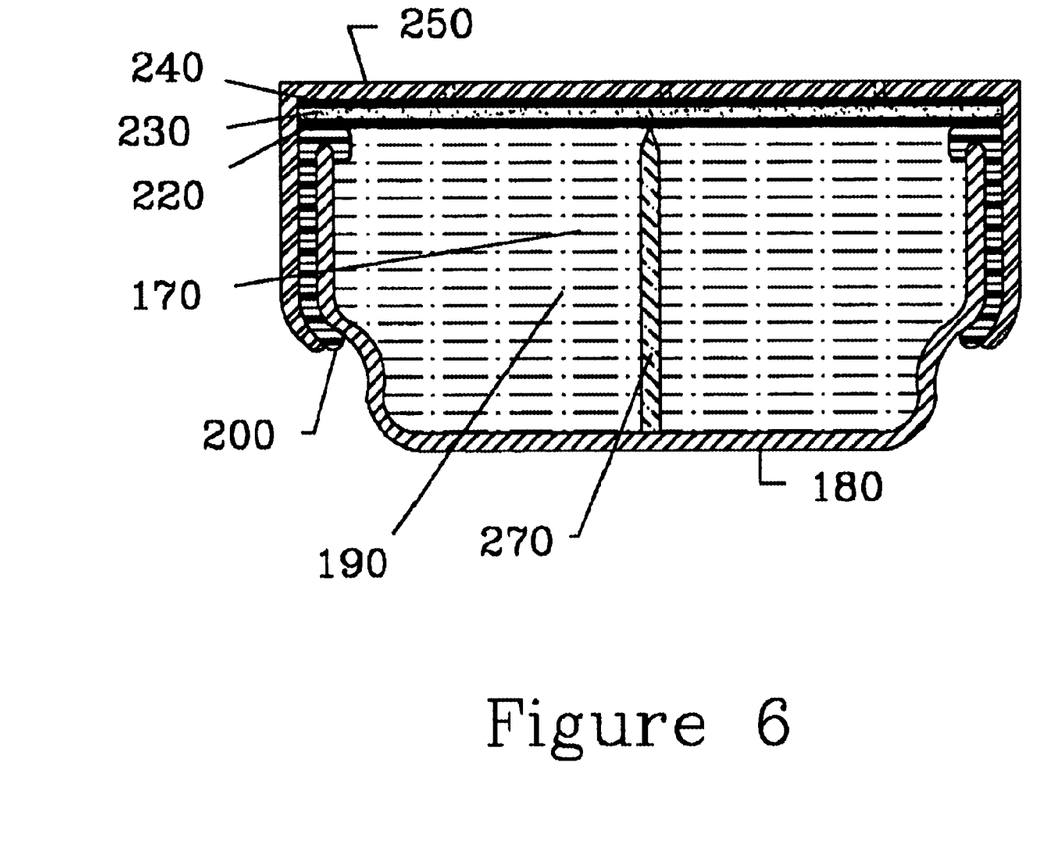
FIG. 6 shows a cross-sectional view of another embodiment of a "button" cell battery employing a layered zinc mesh anode according to the present invention.

FIG. 6 shows button cell 260 which is a modification of the button cell shown in FIG. 5 and previously described above. Unlike the previous embodiment, button cell 260 utilizes current collector 270 which protrudes into button cell 260 from steel cap 180. Current collector 270 extends through the sheets of zinc mesh which comprise anode 170 toward separator film 220. Although the diameter of current collector 270 may vary, a current collector with a diameter of 1/16 of an inch is utilized in the embodiment shown. Current collector 270 is utilized to provide additional shock stability for button cell 260 and to insure that the zinc mesh layers of anode 170 remain stationary and retain continuous electrical contact in order to prevent cell failure.

Figure 7:
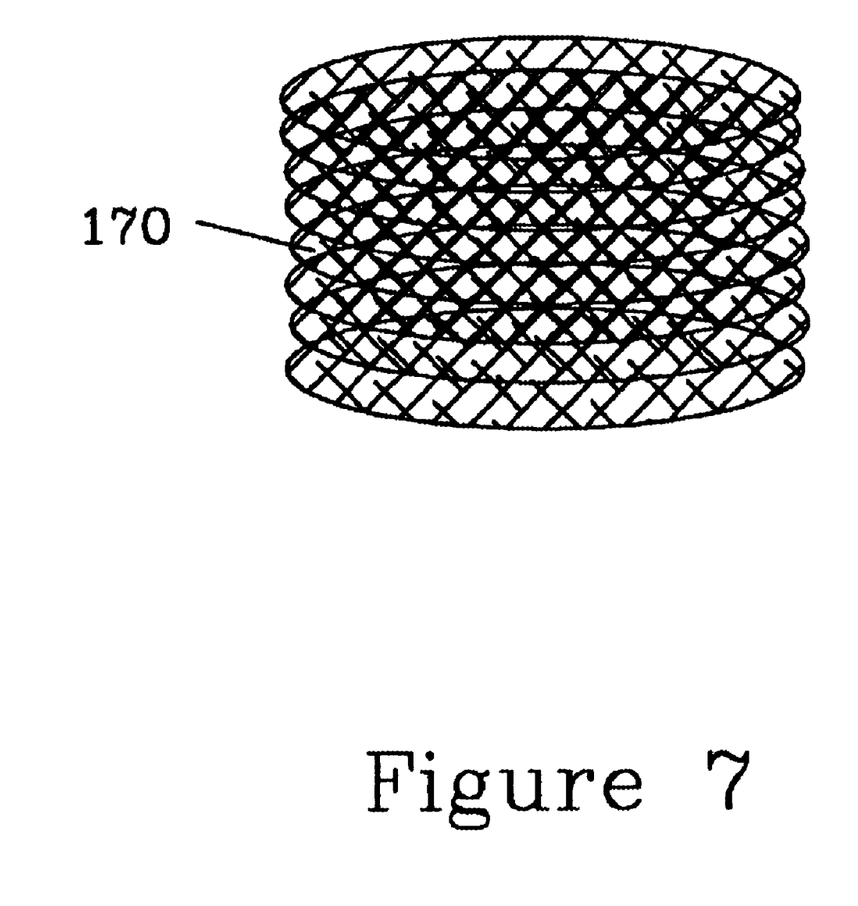
FIG. 7 shows a layered zinc mesh anode of the type used in some embodiments of the present invention.

As shown in FIGS. 5 and 6, the previously described button cells utilize anodes comprised of layers of circular sheets of zinc mesh like the embodiment of the present invention shown in FIG. 7. However, those skilled in the art realize that other embodiments of the present invention could utilize layered sheets of zinc mesh of other shapes. For example, square sheets (not shown) of zinc mesh could be used to eliminate waste from the manufacturing process.

Figure 8:
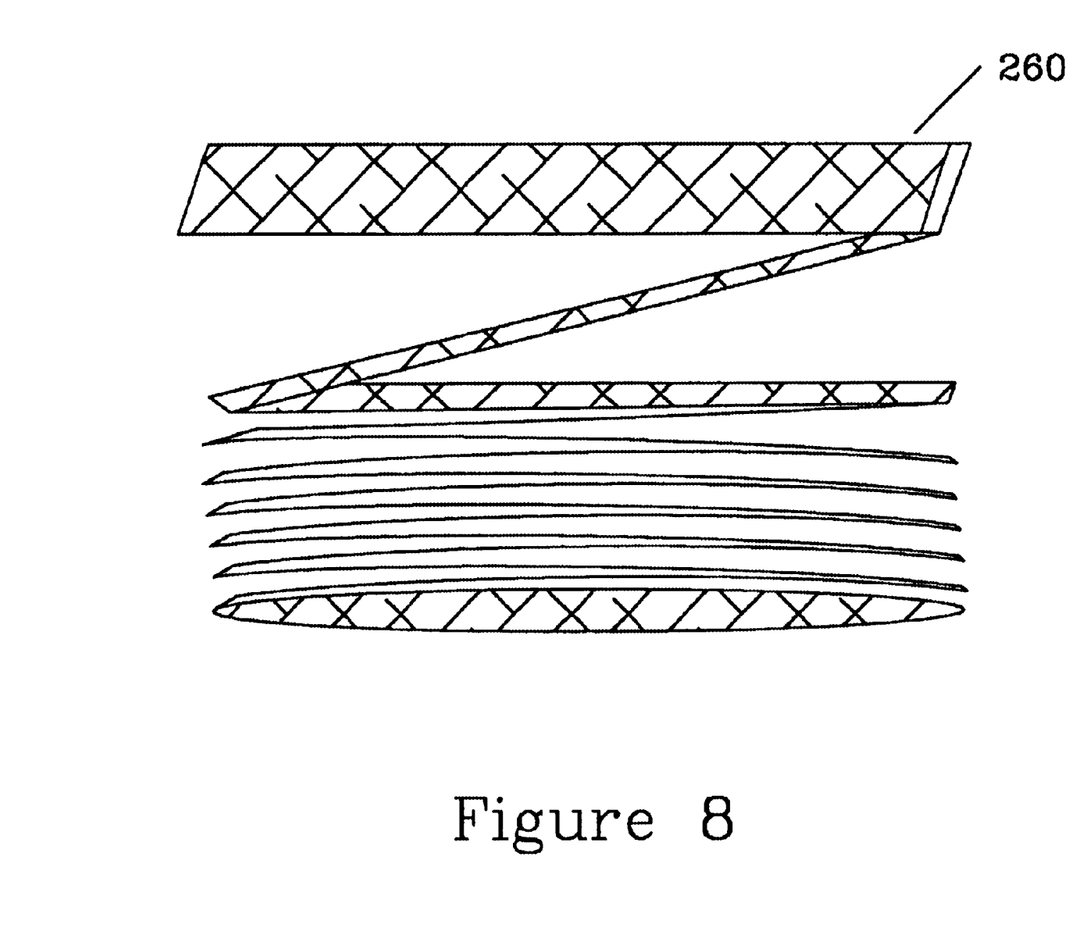
FIG. 8 shows side view of a folded zinc mesh anode of the type used in one embodiment of the present invention with two layers partially unfolded.

FIG. 8 shows still another embodiment of an anode of the present invention. As illustrated in FIG. 8, a single piece of zinc mesh is folded such that it forms electrical contact with itself in order to form anode 260. Each time that it is folded, the single piece of zinc mesh forms an additional layer, which is in electrical contact with the adjacent layers. As the zinc mesh is folded, a continuous interconnected lattice of zinc is formed. This configuration allows better connectivity of the zinc and therefore increases battery performance at high drain rates. This design, like the embodiments of anodes of this invention already discussed, alleviates the need for spacers to maintain uniform space between the layers of the electrode. Like the "layered" design of anode 170, anode 260 could be used in a flat button cell substantially similar to the one pictured in FIG. 5 and described above.

The previously described embodiments of the present invention all use expanded zinc mesh. A mesh with a strand width of 0.006 inches, a gauge of 0.006 inches, an LWD of 0.10 inches, and an SWD of 0.50 inches was found to provide maximum battery power at high drain rates. However, the use of a zinc mesh anode with measurements within the following ranges is acceptable: a strand width of 0.003 inches to 0.010 inches, a gauge of 0.003 inches to 0.010 inches, an LWD of 0.05 to to 0.15 inches, and an SWD of 0.025 to 0.075 inches.

The present invention holds many advantages over the prior art. The increased surface area of the present invention provides numerous reaction sites between the electrolyte solution and the zinc anode. Additionally, the interconnectivity of the zinc mesh anode designs provide a multitude of conduction pathways. Unlike cells utilizing powdered zinc which require intimate particle to particle contact and intimate particle to current collector contact, in a zinc mesh anode according to the present invention, once intimate current collector contact is provided, intimate contact is sustained from the current collector out to the anode, separator, and cathode interface by the continuous lattice networks previously described, allowing for new anode technology designs not possible using powdered zinc. These features help to alleviate the problems of zinc passivation. By alleviating the problem of zinc passivation, these features increase efficiency at high discharge rates. Increased efficiency leads to less wasted zinc in the drained cell and the ability to produce more power with less zinc. The necessity for less zinc allows room for added electrolyte solution which also helps to increase cell capacity.

A further advantage of the present invention is decreased cost. The use of zinc mesh avoids the use of expensive battery-grade zinc powder which is currently in demand. The present invention further cuts costs by eliminating the need to use a suspension agent. Manufacturing expenses are also decreased by eliminating the need for the use of spacers, which were required in previous zinc mesh designs. Finally, the current design minimizes the necessity for and use of environmentally damaging chemicals, such as mercury, which are typically used in cells employing zinc powder anodes to increase performance at high discharge rates.

While the present invention has been described in detail with reference to exemplary embodiments thereof, such is offered by way of non-limiting example of the invention, as many other versions are possible. It is anticipated that a variety of other modifications and changes will be apparent to those having ordinary skill in the art and that such modifications and changes are intended to be encompassed within the spirit and scope of the invention as defined by any later appended claims.

We claim:

1. An anode comprising a sheet of expanded zinc mesh having a top surface and a bottom surface, the sheet being coiled such that the top surface and the bottom surface are in electrical contact.

2. An anode of claim 1 wherein the sheet of expanded zinc mesh has a strand width in the range of about 0.003 inches to about 0.010 inches.

3. An anode of claim 1 wherein the sheet of expanded zinc mesh has a gauge in the range of about 0.003 inches to about 0.010 inches.

4. An anode of claim 1 wherein the sheet of expanded zinc mesh has an LWD in the range of about 0.05 inches to about 0.15 inches and having an SWD in the range of about 0.025 inches to about 0.075 inches.

5. An anode of claim 1 wherein the sheet of expanded zinc mesh has a strand width of about 0.006 inches, a gauge of about 0.006 inches, an LWD of 0.10 inches and an SWD of 0.050 inches.

6. An anode comprising a sheet of expanded zinc mesh having a top surface and a bottom surface, the sheet being folded upon itself one or more times such that at least one of the surfaces is in electrical contact with itself.

7. An anode of claim 6 wherein the sheet of expanded zinc mesh has a strand width in the range of about 0.003 inches to about 0.010 inches.

8. An anode of claim 6 wherein the sheet of expanded zinc mesh has a gauge in the range of about 0.003 inches to about 0.010 inches.

9. An anode of claim 6 wherein the sheet of expanded zinc mesh has an LWD in the range of about 0.05 inches to about 0.15 inches and having an SWD in the range of about 0.025 inches to about 0.075 inches.

10. An anode of claim 6 wherein the sheet of expanded zinc mesh has an a strand width of about 0.006 inches, a gauge of about 0.006 inches, an LWD of 0.10 inches and an SWD of 0.050 inches.

11. An anode comprising a first sheet of expanded zinc mesh and a second sheet of expanded zinc mesh each having a top surface and a bottom surface, the second sheet being layered on the first sheet such that the top surface of the first sheet is in electrical contact with the bottom surface of the second sheet.

12. An anode of claim 11 wherein a third sheet of expanded zinc mesh is layered on the second sheet such that the top surface of the second sheet is in electrical contact with the bottom surface of the third sheet.

13. An anode of claim 11 wherein a plurality of sheets of expanded zinc mesh are layered on the second sheet such that each sheet is in electrical contact with the sheet below it.

14. An anode of claim 11 wherein the sheet of expanded zinc mesh has a strand width in the range of about 0.003 inches to about 0.010 inches.

15. An anode of claim 11 wherein the sheet of expanded zinc mesh has a gauge in the range of about 0.003 inches to about 0.010 inches.

16. An anode of claim 11 wherein the sheet of expanded zinc mesh has an LWD in the range of about 0.05 inches to about 0.15 inches and having an SWD in the range of about 0.025 inches to about 0.075 inches.

17. An anode of claim 11 wherein the sheet of expanded zinc mesh has an a strand width of about 0.006 inches, a gauge of about 0.006 inches, an LWD of 0.10 inches and an SWD of 0.050 inches.

18. An electrochemical cell comprising:
a cylindrical casing forming an enclosed battery chamber;
the anode of claim 1 within the battery chamber;
a cathode within the battery chamber and arranged between the anode and the casing;
an insulating separator means within the battery chamber and between the anode and cathode; and
an electrolyte solution within the battery chamber capable of being diffused through the insulating separator.

19. An electrochemical cell comprising:
a casing forming an enclosed battery chamber;
an insulating separator means dividing the battery chamber into an anode side and a cathode side;
the anode of claim 6 within the anode side of the battery chamber;
a cathode within the cathode side of the battery chamber; and
an electrolyte solution within the battery chamber capable of being diffused through the insulating separator.

20. An electrochemical cell comprising:
a button shaped casing forming an enclosed battery chamber;
an insulating separator means dividing the battery chamber into an anode side and a cathode side;
the anode of claim 11 within the anode side of the battery chamber;
a cathode within the cathode side of the battery chamber; and
an electrolyte solution within the battery chamber capable of being diffused through the insulating separator.

* * * * *